(12) United States Patent
Lyberg

(10) Patent No.: US 6,389,396 B1
(45) Date of Patent: May 14, 2002

(54) DEVICE AND METHOD FOR PROSODY GENERATION AT VISUAL SYNTHESIS

(75) Inventor: Bertil Lyberg, Vagnharad (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/381,632

(22) PCT Filed: Mar. 20, 1998

(86) PCT No.: PCT/SE98/00506

§ 371 Date: Nov. 29, 1998

§ 102(e) Date: Nov. 29, 1998

(87) PCT Pub. No.: WO98/43235

PCT Pub. Date: Oct. 1, 1998

(30) Foreign Application Priority Data

Mar. 25, 1997 (SE) ............................................. 9701101

(51) Int. Cl.⁷ ............................................. G10L 13/08
(52) U.S. Cl. ........................................ 704/258; 704/276
(58) Field of Search ............................... 704/270, 272, 704/276, 277, 278, 260, 258, 254, 257

(56) References Cited

U.S. PATENT DOCUMENTS

| | | | |
|---|---|---|---|
| 5,657,426 A | * 8/1997 | Waters et al. | 704/276 |
| 5,826,234 A | * 10/1998 | Lyberg | 704/277 |
| 5,878,396 A | * 3/1999 | Henton | 704/276 |
| 6,122,616 A | * 9/2000 | Henton | 704/258 |

FOREIGN PATENT DOCUMENTS

| | | | |
|---|---|---|---|
| EP | 0 624 865 | 11/1994 | |
| EP | 0 624 865 A1 * | 11/1994 | G10L/5/04 |
| EP | 0 664 537 | 7/1995 | |
| EP | 0 664 537 A2 * | 7/1995 | G10L/9/00 |
| EP | 0 710 929 | 5/1996 | |
| EP | 0 710 929 A2 * | 8/1996 | G06T/15/70 |
| EP | 0 778 560 | 6/1997 | |
| GB | 2 231 246 | 11/1990 | |
| GB | 2 250 405 | 6/1992 | |
| WO | WO 97/34292 | 9/1997 | |

* cited by examiner

Primary Examiner—Richemond Dorvil
(74) Attorney, Agent, or Firm—Oblon, Spivak, McClelland, Maier & Neustadt, P.C.

(57) ABSTRACT

A device for prosody generation at visual synthesis. A number of half-syllables are stored together with registered movement patterns in a face. When synthesizing speech, a number of half-syllables are put together into words and sentences. The words and sentences are given a stress and pattern of intonation corresponding to the intended language. In the face, a number of points and their movement patterns are further registered. In connection with the generation of words and sentences, the movement patterns of the different points are amplified depending on a given stress and sentence intonation. The given movement patterns are after that applied to a model, which is applied to a real face at which a life-like animation is obtained, at for instance a translation of a person's speech in a first language to a second language.

15 Claims, 2 Drawing Sheets

DEVICE AND METHOD FOR PROSODY GENERATION AT VISUAL SYNTHESIS

BACKGROUND OF THE INVENTION

1. Field of the Invention

The present invention relates to face animation at synthetically generated speech and to the speech belonging movement patterns. Especially is related to animation where a person who is speaking a first language which is translated into a second language which replaces the speaker's original language at the reproduction.

2. Discussion of the Background

In patent application Se 9504367-5 is described how one can make visual synthesis with movement patterns directly connected to recorded "sounds", polyphones determined by half-syllables. These movement patterns are recorded in nonsense syllables and in a frame phrase with the main stressed word after the test syllable in order to get as even a fundamental tone (f0) of the test syllable as possible, which is a condition for that at synthesis have possibility to artificially change this (f0) as much as possible. Visual synthesis certainly will be totally synchronized to the sound wave and be possible to be extended or "shortened" in time depending on manipulation of the segments of the sound wave. On the other hand the movement patterns will not be able to signal prosodic information which is connected to larger deviations of movement in stressed than in unstressed syllable and at information focus when also the deviations of movement normally is larger than at no-focal position. The present invention has as its task to indicate a solution to the above mentioned problem.

In the Swedish patent application No 9504367-5 is informed about how facial expressions can be associated to produced sounds. Here is described how polyphones are stored together with movement patterns in connection with the sounds in question. The patent document, however, does not inform about how stresses and accentuations in the speech shall be reproduced at the animation.

SUMMARY OF THE INVENTION

The present invention relates to a device for prosody generation at visual synthesis. A number of half-syllables are stored together with registered movement patterns in a face. At concatenation synthesis of speech a number of half-syllables are put together to words and sentences. The words and the sentences are given a stress and an intonation pattern corresponding to the intended language. In the face a number of points and their movement patterns further have been registered. In connection with the generation of words and sentences the movement patterns of the different points are amplified depending on a given stress, sentence intonation. The given movement patterns after that are applied to the face, at which a lifelike animation is obtained at for instance a translation of a person's speech in a first language to a second language. In a first embodiment the invention includes means for storing and reproduction of sound. Further, to the sounds associated movement patterns in a face are registered. Said movement pattern is represented by a number of points in the face. Sounds in question chiefly consist of a number of half-syllables, for instance "spru". Movement patterns, in the model, for respective half-syllables are further registered and stored in said means or in database accessible from the means. In connection with the production of words and sentences said half-syllables are put together. At that a sequence is obtained which corresponds to one of the speaker intended line of words. In order to effect a natural spoken sequence, the speech is given a stress and sentence intonation corresponding to the inward sense of the speech. The movements of the different points further are put together and applied to the facial model, at which one to the in the speech corresponding movement pattern is obtained. A facial texture is after that applied to the model. To make the movement pattern in the face lifelike, the movement patterns are amplified in relation to stresses. Said stresses in the speech are applied to a facial model.

The movement pattern of the face is represented by a number of stored half-syllables. These half-syllables and belonging movement patterns are recorded in a neutral frame of mind respective stress. A set of half-syllables are stored in this way together with movement patterns in question. At translation of a speech in a first language to a second language, the fundamental stresses and movement patterns are transferred to the second language. One in the face reproduced movement pattern will at that be reflected in the reproduced speech.

The device further appoints stress positions for sentences and/or separate words. This can be done by already known methods, see for instance patent application No 9504367-5 which deals with speech synthesis. Accentuations and stresses are transferred to corresponding movement pattern in the movement pattern of the face. At reception of the speech in a first language the device further is arranged to translate the speech into a second language. Stresses in the first speech are registered and transferred to stresses in corresponding parts of the second language. The movement patterns in the face are at that adapted to the second language for stresses, sentence accentuations, as well as intonations. The speaker in this way is given one to the face applied movement pattern corresponding to one in the second language produced speech.

The in the face registered points are recorded for instance with marked face points which are followed by laser light or the like. The selection of points in the face is depending on to which extent the animation shall be, or is required to correspond to, a real movement pattern. The invention further relates to a method at visual speech synthesis. Words and sentences are created by putting together polyphones and stresses in words and clauses.

By the present invention possibility is given to reproduce a speaker's presentation in a second language by one in the face reproduced movement pattern which corresponds to the movement pattern in the second language. Utilization of the invention is of importance at for instance phoning where the speaker is represented in picture. In a future when telecommunication systems will be responsible for translation between different languages, the risk of misunderstanding will, if not be eliminated, at least be considerably reduced. The fields in telephony which today are of interest are broadband transmissions which are applied at conference telephony. It also can be supposed to be of importance at video-telephony between individuals in future telecommunication systems as also the households by and by are getting broadband connections with possibility to utilize video-telephony.

DISCUSSION OF THE PREFERRED EMBODIMENT

In the following the invention is described on the basis of the figures and the terms in them.

The present invention suggests that the movement patterns are amplified by a function G(t) which has its maximum in the middle of the core of the syllable (vowel middle) and minimum in the syllable borders.

Figure 1:
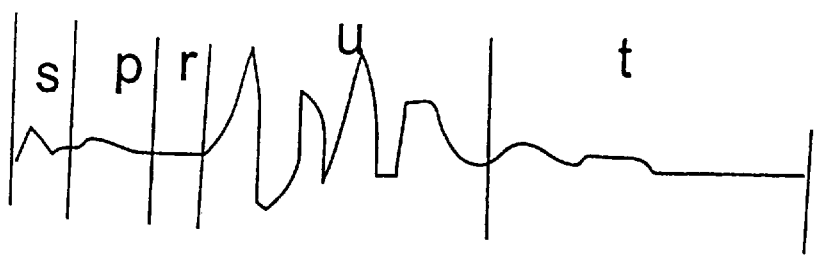
FIG. 1 shows how a pronounced word is divided into segments.

Each sound and combination of sounds etc in a language is allocated one for the language typical movement pattern. These movement patterns consist of a basic movement for sound combinations in speech in not-focal position. Lip-and facial expression are being applied a function G(t) which is connected to the sound wave for determination of which parts in a speech that are stressed, unstressed, accentuated etc. If, for instance, the word "sprut" (spru:t), FIG. 1, shall be reproduced, the included sounds are divided into segments. For each sound the function at this has a given movement pattern for lips and other facial movements.

Linking of the movement patterns is made in a way which links up the different movement patterns to an entirety. In the example "sprut", the stress of the vowel u will constitute a maximum. The neutral movement patterns which are given at the basic animation of "sprut" is applied to the amplification signal G(t). Lip movements and other facial expressions are at that amplified to an extent which corresponds to the stress respective stress on the syllable in question. The amplifications in this case consist of an amplification of especially the lip movements but also other facial expressions. In corresponding way the function G(t) adapts amplifications of the movement pattern in the face with regard to stresses in sentences which are pronounced.

Figure 2:
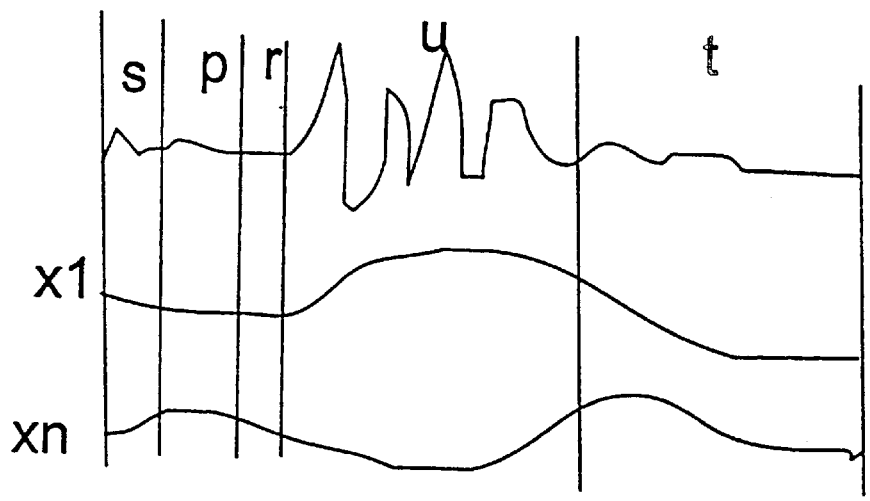
FIG. 2 shows a connection between different points in a face and pronounced words.

A connection between the sound wave and the movement pattern consequently is obtained according to FIG. 2. The movement patterns for the different parts in for instance the face which one wants to have reproduced, are reproduced. Parts of the face which are reproduced can be a number of points which has been placed in the face, the movement patterns of which are recorded together with the sound signal. Different parts of the movements will be amplified by the function G(t). However, it can be that different parts of the face are influenced to different extents at stresses. To bridge this state of affairs, a weighing function which is individual for the different parts of the face can be introduced.

Figure 3:
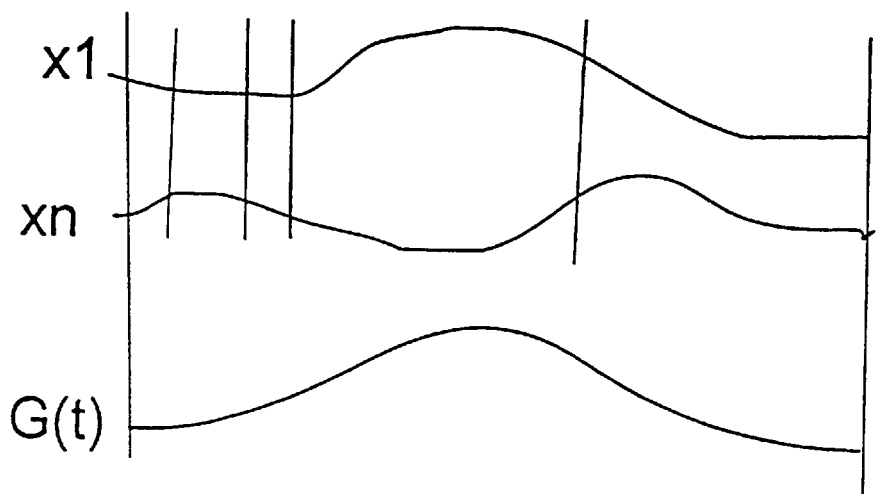
FIG. 3 shows how the amplification of the movement in different parts of the face is influenced by a function G(t).

In FIG. 3 is shown how the movement patterns for the different parts of the face is led to an amplifying device and adapts the movement pattern to the wanted one. By this manipulation of the movement patterns for stressed/unstressed syllable, information focus (sentence accent) etc with different functions and for contrastive stress, i.e. at stress of specific word and its included syllables.

Figure 4:
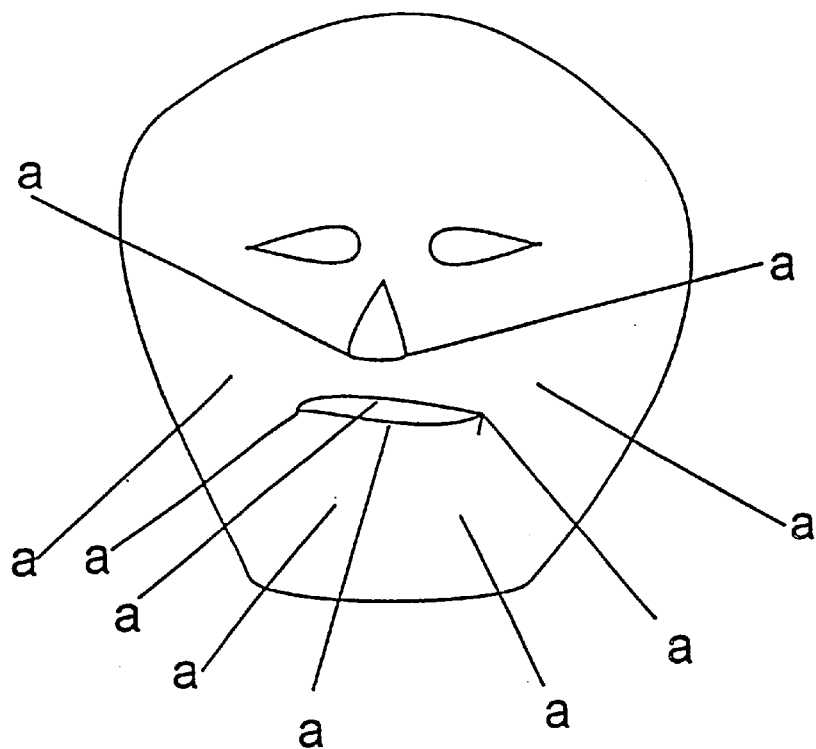
FIG. 4 shows example of selected points in a face.
Figure 5:
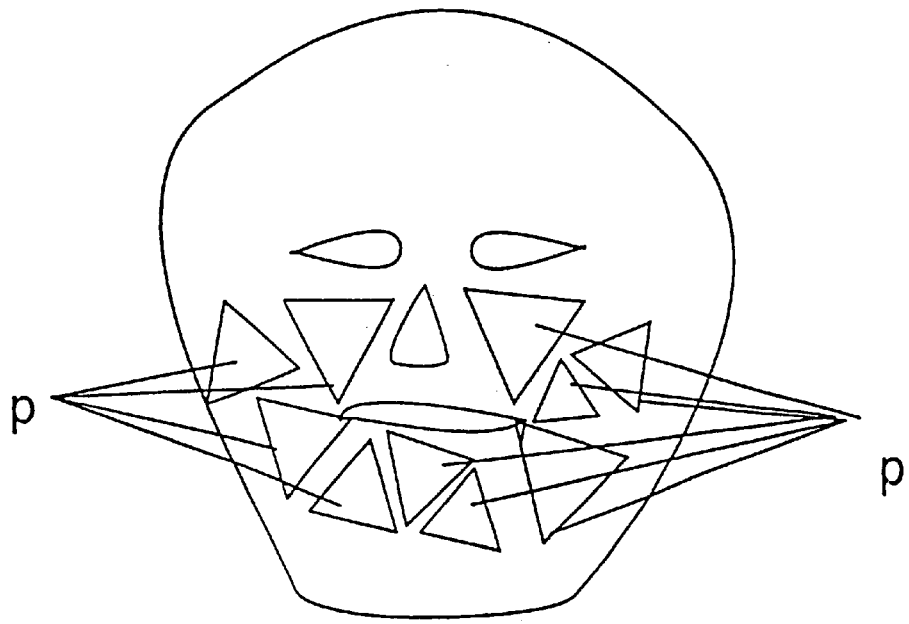
FIG. 5 shows areas which are influenced in a facial model.

According to the invention a number of sounds, half-syllables, are recorded without stresses influencing the pronounciation. To achieve this, preferably nonsense words are recorded. In connection with the recordings a number of points, a, are marked, see FIG. 4. The markings are made in such a way that the points can be registered by means of for instance laser technology. Recorded sounds and movement patterns will at that be registered together. At for instance translation of a speaker's speech in a first languge to a second language, the registered movements of the face are transferred to a model, FIG. 5. In the model the movements are fit in by polygones, in the figures shown as triangles. The real face which is used is applied over the model. At this, the different parts of the face will be animated to the speech which shall be reproduced.

The invention is not limited to the above described example of embodiment or to following patent claims, but may be subject to modifications within the frame of the idea of invention.

What is claimed is:

1. A device for prosody generation and visual synthesis, comprising:

capturing means for capturing sounds and face movement patterns of a physiognomy of a first face during a speech, wherein the face movement patterns include a position and displacement of selected points on the first face;

storing means for storing the captured sounds and face movement patterns;

reproducing means for reproducing the stored sounds and face movements patterns of the first face on a second face; and amplifying means for amplifying the face movement patterns reproduced on the second face, based on stresses of the speech of the first face.

2. A device according to claim 1, wherein the reproducing means comprises a mechanism configured to produce a physiognomy of the second face by concatenating a number of the recorded face movement patterns, wherein each face movement pattern corresponds to a neutral pronunciation of a half-syllable.

3. A device according to claim 2, wherein the sounds and face movement patterns corresponding to half-syllables are stored in association in the storing means.

4. A device according to claim 3, wherein the amplification means allots a maximum amplification to a vowel in the middle of the half-syllable and a minimum amplification to the ends of the half-syllable.

5. A device according to claim 1 or 2, wherein the reproducing means, based on the amplifying means, is configured to output sounds and face movement patterns on the second face, reproducing the stresses of the speech of the first face.

6. A device according to claim 1 or 2, comprising translation means for translating from a speech in a first language to a speech in a second language.

7. A device according to claim 6, wherein the capturing means captures stresses of the speech in the first language and the reproducing means, based on an input from the translation means, is configured to reproduce the face movement patterns and the stresses of the first face in the speech of the second language on the second face.

8. A device according to claim 1 or 2, wherein the reproducing means is configured to apply the sounds and face movement patterns of the first face to the second face, so that a three dimensional animation of the second face is produced.

9. A device according to claim 8, wherein polygons instead of points are selected on the second face for applying the face movement patterns of the first face.

10. A method for prosody generation and visual synthesis using selected polygons on a second face, comprising:

capturing sounds and face movement patterns corresponding to polyphones of a first face;

recording speaking stresses of polyphones;

amplifying the captured face movement patterns based on the recorded stresses of the polyphones;

selecting points in the selected polygons on the second face;

reproducing captured sounds and amplified face movement patterns of the first face onto the second face, wherein the points in the selected polygons are allocated a weighting which is influenced by the speaking stresses of the polyphones; and animating the second face by a movement of selected polygons according to the captured face movement patterns of the first face and reproducing the captured sounds so that a three-dimensional picture is created on the second face.

11. A method according to claim 10, wherein the weighting of the points in the selected polygons of the second face changes a displacement of the points of the second face.

12. A method according to claim 10 or 11, comprising:

generating sounds with polyphones of neutral pronunciation; and registering simultaneously the sounds of polyphones of neutral pronunciation with the corresponding face movement patterns.

13. A method according to claim 12, comprising recording the face movement patterns of a group of persons.

14. A method according to claim 13, wherein the recording has a group of persons including men, women, and children.

15. A method according to claim 10 or 11, further comprising producing sounds for polyphones from a text.

* * * * *